(12) United States Patent
Kim

(10) Patent No.: US 10,282,244 B2
(45) Date of Patent: May 7, 2019

(54) METHOD FOR SAVING FAULT WAVE DATA

(71) Applicant: LSIS CO., LTD., Anyang-si, Gyeonggi-do (KR)

(72) Inventor: Ji Ung Kim, Cheongju-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 290 days.

(21) Appl. No.: 14/882,134

(22) Filed: Oct. 13, 2015

(65) Prior Publication Data

US 2016/0110245 A1 Apr. 21, 2016

(30) Foreign Application Priority Data

Oct. 20, 2014 (KR) .................. 10-2014-0141973

(51) Int. Cl.
*G06F 11/07* (2006.01)
*G06F 11/14* (2006.01)
*G05B 23/02* (2006.01)

(52) U.S. Cl.
CPC ...... *G06F 11/0787* (2013.01); *G05B 23/0221* (2013.01); *G05B 23/0264* (2013.01); *G06F 11/1446* (2013.01); *G05B 2219/23115* (2013.01)

(58) Field of Classification Search
None
See application file for complete search history.

(56) References Cited

U.S. PATENT DOCUMENTS

| | | | | |
|---|---|---|---|---|
| 5,909,559 A * | 6/1999 | So | ............... | G06F 13/4018 710/307 |
| 6,611,724 B1 * | 8/2003 | Buda | ............... | G05B 19/0428 700/49 |
| 6,996,640 B1 * | 2/2006 | Hill | ............... | G06F 5/14 710/53 |
| 2007/0162213 A1 | 7/2007 | Bode et al. | | |
| 2009/0062933 A1 | 3/2009 | Eryurek et al. | | |

FOREIGN PATENT DOCUMENTS

| | | |
|---|---|---|
| CN | 102822688 A | 12/2012 |
| CN | 103019957 A | 4/2013 |
| EP | 2172824 | 4/2010 |
| JP | 8023806 B2 | 3/1996 |
| JP | 2002181877 A | 6/2002 |
| KR | 1020060082708 | 7/2006 |

OTHER PUBLICATIONS

European Patent Office Application Serial No. 15189818.0, Search Report dated Apr. 5, 2016, 8 pages.
Chinese Office Action for related Chinese Application No. 201510795832.1; action dated Sep. 28, 2017; (7 pages).
Korean Notice of Allowance for related Korean Application No. 10-2014-0141973; action dated Feb. 9, 2018; (4 pages).

* cited by examiner

*Primary Examiner* — James G Norman
(74) *Attorney, Agent, or Firm* — K&L Gates LLP

(57) ABSTRACT

There is provided a method for saving fault wave data, in which when a fault wave generated in a system is saved, a size of wave data is calculated, and the saving of the wave data is performed according to the size of the wave data, so that it is possible to implement the use of spaces of a buffer and a memory and the simultaneous saving of wave data simultaneously or subsequently generated. Accordingly, it is possible to minimize a delay in the saving of the wave data. Also, it is possible to record all accurate wave data even when consecutive faults occur. Also, it is possible to efficiently use the space of the memory.

4 Claims, 3 Drawing Sheets

DSP data Position Cases

METHOD FOR SAVING FAULT WAVE DATA

CROSS-REFERENCE TO RELATED APPLICATIONS

Pursuant to 35 U.S.C. § 119(a), this application claims the benefit of earlier filing date and right of priority to Korean Application No. 10-2014-0141973, filed on Oct. 20, 2014, the contents of which is hereby incorporated by reference herein in its entirety.

BACKGROUND OF THE DISCLOSURE

1. Field of the Disclosure

The present disclosure relates to a method for saving fault wave data, and more particularly, to a method for saving fault wave data, in which when a fault wave generated in a system is saved, a size of wave data is calculated, and the saving of the wave data is performed according to the size of the wave data, so that it is possible to implement the use of spaces of a buffer and a memory and the simultaneous saving of wave data simultaneously or subsequently generated.

2. Description of the Background Art

FIG. 1 is a block diagram illustrating a wave data saving function of a typical digital relay, which shows a scheme of saving fault wave data when a fault occur in a system having a relay built therein.

In general, when a fault occurs, several relay elements are simultaneously or consecutively operated, but only about one fault wave data is saved at a specific point of time (e.g., the first fault among several faults) according to the performance of a device, based on the first fault.

Basic facts in saving of wave data, which was conventionally applied, are as follows.

Wave raw data is recorded in an internal buffer from an operation board at every 1 ms.

If a wave source is generated according to settings of an HMI, a start signal is generated such that wave data is recorded in a flash memory in main processing.

The other wave data except a pre-cycle are recorded by the start signal. If the recording is completed, subsequently input data are recorded without omission by using another buffer.

An identifier of a specific block area is provided and managed by an external request (manager) such that saved wave data can be transmitted with a defined frame through communication.

An operation scheme of acquiring raw data at every 1 ms from a DSP and saving the acquired raw data in a buffer is as follows.

Position of saving command: an interrupt operation is performed at ever 1 ms.

A raw data pointer of the operation board is received at every time to save the received raw data pointers in the buffer from a previous time to a current sample pointer.

The buffer per channel is operated to have a number (a size twice greater than 128 cycles*64 samples*1 channel=8192) where data can be maximally saved or operated to save the data An example in which fault wave data is saved in a buffer through the above-described principle is illustrated in FIGS. 2 and 3.

FIG. 2 is a graph 1 illustrating an example in which fault wave data is saved in a buffer according to a conventional art.

FIG. 3 is a graph 2 illustrating the example in which the fault wave data is saved in the buffer according to the conventional art.

When first wave data is saved, a first buffer uses an arrangement of 0 to 8192 as shown in FIG. 2, and a second buffer in which instantaneous raw data is saved during the saving of wave data uses an arrangement of 8193 to the end as shown in FIG. 3.

The conventional method for saving fault wave has problems as follows.

In the case of a fault wave, a large amount of data should be managed and saved. However, the function of writing data in a nonvolatile memory cannot exceed about 20 to 30 bytes per 1 ms, based on a FRAM. In the case of other memories (a flash memory, etc.), the time required to write data may be further increased. Such a time limitation should be maintained such that the real-time performance of a relay operation. However, due to difficulty in managing and saving data, the number of buffers is specified as 1 or 2, and it is difficult to save another wave data until the writing of the data is completed. Therefore, when faults are consecutively generated, new fault wave data cannot be saved within a wave data saving time (1 to 2 seconds in a fast case or 7 to 8 seconds in a late case).

After a point of time when a fault occurs is specified, the method for collecting and writing all buffer data of the corresponding point of time and the corresponding fault can be performed only when fault wave data are all retained. Therefore, the size of the buffer should be increased, and another real-time raw data should be saved in the buffer while the wave data is saved. Hence, the size of the buffer becomes double without condition. The waste of the memory due to the increase in size is unavoidable.

In the conventional configuration, only one wave data is recorded when multiple faults occur according to the operation of an instantaneous relay element (less than 50 ms) having the shortest fault time, due to the limitation of H/W performance and in terms of S/W. In addition, there is no record for faults having an interval between the total wave cycle in which wave data is saved and a point of time when the saving of the wave data is completed. For example, if the period in which wave data is saved is two seconds, and the time required to save the wave data is five seconds, there may be no data capable of analyzing faults occurring during an interval of three seconds.

When a fault is generated in a system, and accordingly, multiple faults are consecutively generated, a relay controls a circuit breaker to separate the corresponding system. In this case, saved wave data becomes a basis for inferring how the quantity of electricity in the system is changed in examination of situations and causes. Hence, the saved wave data becomes an important factor in the reliability and performance of a device. In addition, relay manufacturers frequently do business by using, as specifications, a number of fault wave data to be saved, a period in which the fault wave data is saved, and the like.

However, in the conventional method, fatal disadvantages definitely exist due to the above-described reasons, and wave data cannot be saved in a specific situation. Therefore, the image of products is deteriorated together with the reliability of the device.

When a memory is used by setting the size of the memory to be excessively large, it is important to manage the memory in a stack area and a heap area. This causes a fatal error such as memory leak or stack overflow, and therefore, the device may erroneously operate.

SUMMARY OF THE DISCLOSURE

Therefore, an aspect of the detailed description is to provide a method for saving fault wave data, in which wave data is saved in a storage device by calculating a size of the wave data, and a space of the storage device is ensured, so that it is possible to simultaneously store wave data subsequently or simultaneously generated.

To achieve these and other advantages and in accordance with the purpose of this specification, as embodied and broadly described herein, a method for saving fault wave data includes: detecting and sampling a fault wave generated in a system; calculating a total length of sampled wave data; calculating a division size and a saving time, where the wave data is to be saved, by dividing the wave data; adjusting the size of a buffer such that data on a next fault wave is to be recorded, based on the division size and the saving time; and saving the wave data according to the division size and the saving time.

In one exemplary embodiment, when the wave data is recorded in the buffer, an index for detection information may be included in the wave data.

In one exemplary embodiment, in the calculating of the total length, a size of a memory in which the wave data is to be saved may be calculated.

In one exemplary embodiment, the division size may be a unit size in which the wave data is to be divided and saved, and the saving time may be a time required to save the wave data according to the division size.

In one exemplary embodiment, the buffer may have a multi-buffer structure in which at least one wave data is recordable.

In one exemplary embodiment, the saving of the wave data may include recording next fault wave data in the buffer.

In one exemplary embodiment, the wave data may be saved in real time by detecting the fault wave in real time.

In one exemplary embodiment, the wave data may be saved in real time by detecting the fault wave in real time.

In the method according to the present disclosure, wave data is accurately calculated in advance, and minutely divided to a minimum unit, so that it is possible to minimize a delay in saving of the wave data.

Also, the delay in saving of the wave data is minimized, so that it is possible to record all accurate wave data even when consecutive faults occur.

Also, it is possible to efficiently use a space of the memory.

Also, it is possible to prevent the occurrence of an error due to allocation of the memory.

Also, the function of saving consecutive fault wave data is implemented and applied, so that it is possible to provide consistency in operation of the relay applied to the system and all accurate and consecutive data on the situation of a fault.

Also, it is possible to improve the reliability and satisfaction of a device, and maximize the efficiency use of the memory operated in the relay and the reliability of the operation of the memory.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
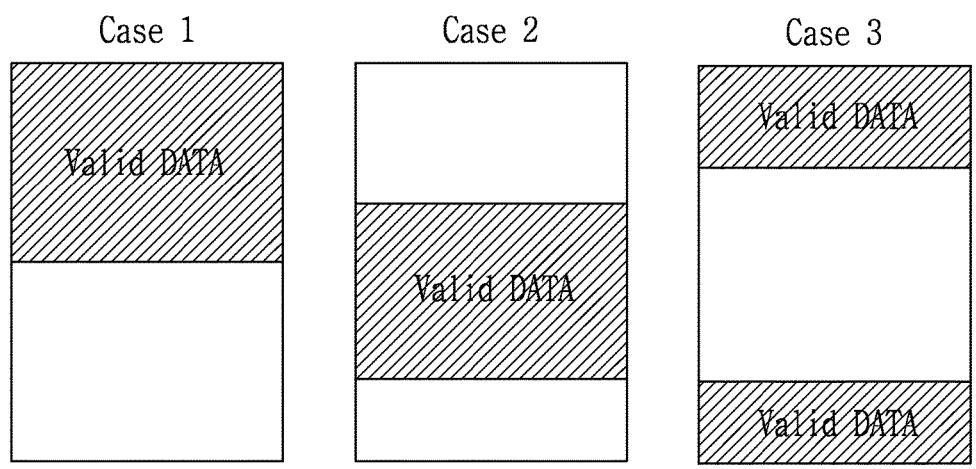
FIG. 1 is a conceptual diagram illustrating a process in which a conventional relay saves fault wave data.

The present disclosure can be applied to a method for saving fault wave data. However, the present disclosure is not limited thereto, and may be applied to all protection devices such as a relay, a switch, a surge absorber, an electronic contactor, and a circuit breaker, central control device and storage devices included in the protection devices, a system control system, a system control method, a system monitory system, a system monitoring method, and the like. Particularly, the present disclosure may be usefully applied to a device and method for saving fault wave data in a digital relay.

It should be noted that technological terms used herein are merely used to describe a specific exemplary embodiment, but not to limit the present disclosure. Also, unless particularly defined otherwise, technological terms used herein should be construed as a meaning that is generally understood by those having ordinary skill in the art to which the disclosure pertains, and should not be construed too broadly or too narrowly. Furthermore, if technological terms used herein are wrong terms unable to correctly express the spirit of the disclosure, then they should be replaced by technological terms that are properly understood by those skilled in the art. In addition, general terms used in this disclosure should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Hereinafter, exemplary embodiments of the present disclosure will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the disclosure pertains is judged to obscure the gist of the present disclosure. Also, it should be noted that the accompanying drawings are merely illustrated to easily explain the spirit of the disclosure, and therefore, they should not be construed to limit the spirit of the disclosure by the accompanying drawings.

Hereinafter, a method for saving fault wave data according to an exemplary embodiment will be described with reference to FIGS. 4 and 5.

Figure 4:
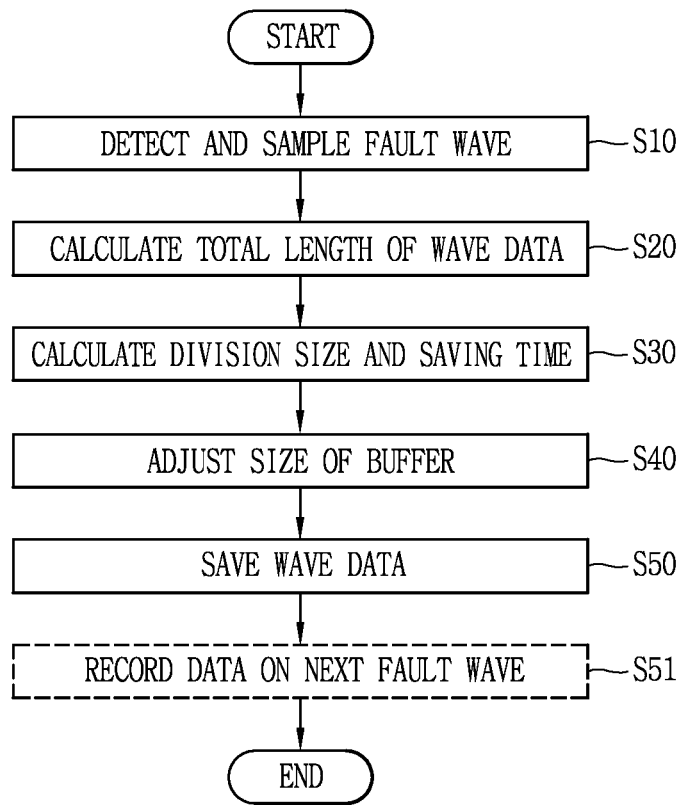
FIG. 4 is a flowchart illustrating a method for saving fault wave data according to an exemplary embodiment.

FIG. 4 is a flowchart illustrating a method for saving fault wave data according to an exemplary embodiment.

Figure 5:
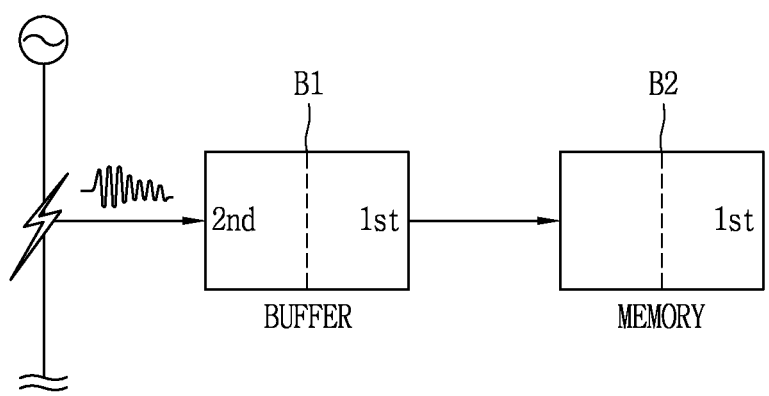
FIG. 5 is a conceptual diagram illustrating the method for saving fault wave data according to the exemplary embodiment.

FIG. 5 is a conceptual diagram illustrating the method for saving fault wave data according to the exemplary embodiment.

As shown in FIG. 4, the method for saving fault wave data (hereinafter, referred to as the saving method) includes detecting and sampling a fault wave generated in a system (S10), calculating a total length of sampled wave data (S20), calculating a division size and a saving time, where the wave data is to be saved, by dividing the wave data (S30), adjusting the size of a buffer such that data on a next fault wave is to be recorded, based on the division size and the saving time (S40), and saving the wave data according to the division size and the saving time (S50).

The saving method may be applied to a digital relay installed in a system to detect a fault of the system.

The saving method may be applied to a method for saving fault wave data in a central control device and a storage device of the digital relay.

That is, the saving method may be applied in the form of a program to the digital relay to be implemented in the digital relay.

In the detecting and sampling of the fault wave (S10), the fault wave may be detected according to a fault current generated in the system, and sampled and converted into data.

In the detecting and sampling of the fault wave (S10), the wave data may be generated by sampling the fault wave.

The wave data may be sampled in units of samples.

For example, the wave data may be sampled into 64 samples.

In the detecting and sampling of the fault wave (S10), the wave data may be generated and recorded in the buffer.

The buffer may means an arbitrary storage device in which the wave data is arbitrarily saved.

The buffer may have a size in which at least one wave data can be recorded.

In the detecting and sampling of the fault wave (S10), when the wave data is recorded in the buffer, an index for detection information may be included in the wave data.

The detection information may be information on an order or time where the fault wave is detected.

That is, the index may be information representing an order in which the wave data is generated.

In the saving method, the recording and saving of the wave data may be performed through the index.

After the detecting and sampling of the fault wave (S10) is performed, the calculating of the total length of the wave data (S20) may be performed.

In the calculating of the total length of the wave data (S20), the total length of the wave data sampled in the detecting and sampling of the fault wave (S10) to be recorded in the buffer may be calculated.

In the calculating of the total length of the wave data (S20), the size of a memory in which the wave data is to be saved may be calculated.

That is, the total length of the wave data may mean a size in which the wave data is to be saved.

The length of the wave data may be a unit of cycle.

For example, the length of the wave data may be 128 cycles.

The size of the memory in which the wave data is to be saved may be a unit of byte.

For example, the size of the memory may be 327680 bytes.

In the calculating of the total length of the wave data (S20), after the size of the memory in which the wave data is to be saved is calculated, the calculating of the division size and the saving time (S30) may be performed.

In the calculating of the division size and the saving time (S30), the division size and saving time of the wave data may be calculated such that when the wave data is saved, the wave data is divided and saved.

The division size may be a unit size in which the wave data is to be divided and saved.

That is, the division size may mean a unit in which the wave data is divided.

The division size may be a minimum unit. The division size may be a unit of byte.

The saving time may be a time required to save the wave data according to the division size.

That is, the saving time may mean a total time required to save the wave data.

In the calculating of the division size and the saving time (S30), the division size and the saving time are calculated, so that the wave data can be saved based on the division size and the saving time.

In the calculating of the division size and the saving time (S30), after the division size and the saving time are calculated, the adjusting of the size of the buffer (S40) may be performed.

In the adjusting of the size of the buffer (S40), the size of the buffer may be adjusted such that data on a next fault wave can be recorded based on the division size and the saving time.

The buffer may have a multi-buffer structure in which at least one wave data can be recorded.

In the adjusting of the size of the buffer (S40), a size required to record the wave data in the buffer may be determined based on the division size and the saving time, so that the size of the buffer can be adjusted based on the determined result.

That is, in the adjusting of the size of the buffer (S40), in order to record wave data generated subsequent to the wave data in the buffer, the size of the buffer may be adjusted such that the wave data is recorded in a size required to recording the wave data in the buffer, based on the division size and the saving time, thereby allocating a space of the buffer.

In the adjusting of the size of the buffer (S40), after the size of the buffer is adjusted such that the data on the next fault wave can be recorded, the saving of the wave data (S50) may be performed.

In the saving of the wave data (S50), the wave data may be saved according to the division size and the saving time.

In the saving of the wave data (S50), the wave data recorded in the buffer may be saved in a built-in memory.

That is, in the saving of the wave data (S50), the wave data arbitrarily recorded in the buffer may be saved in the memory.

In the saving of the wave data (S50), the wave data may be divided based on the division size, so that the divided wave data can be saved in the memory.

In the saving of the wave data (S50), the wave data may be saved in the memory within the saving time.

That is, in the saving of the wave data (S50), the wave data recorded in the buffer may be divided based on the division size, so that the divided wave data can be saved in the memory within the saving time.

The saving of the wave data (S50) may include recording data on a next fault wave in the buffer (S51).

In the saving of the wave data (S50), the wave data recorded in the buffer may be saved, and simultaneously, data on a next fault wave may be recorded in the buffer.

That is, in the adjusting of the size of the buffer (S40), the size of the buffer is adjusted to allocate a space in which the data on the next fault wave is to be recorded, so that, in the saving of the wave data (S50), the wave data is saved in the memory according to the division size and the saving time, and simultaneously, subsequent wave data can be recorded.

In the saving method, the fault wave is detected in real time, so that the wave data can be saved in real time.

That is, the saving of the wave data and the recording of the data on the next fault wave can be performed in real time.

The saving method may be performed based on a concept illustrated in FIG. 5.

As shown in FIG. 5, the saving method is performed through a process in which the detected fault wave is recorded in the buffer B1 and then saved in the memory B2. Hereinafter, a specific example in which the saving method is performed will be described.

A relay to which the saving method is applied will be described as an example. If a fault occurs while a system is normally operated, the index, a flag, etc. at a point of time when the fault wave is detected may be included in the sampled wave data, and the initialization of variables to be managed may be performed.

If the saving of the wave data is started, the wave data may be saved in the corresponding memory according to the division size and the saving time.

If a new fault occurs at the point of time when the wave data is saved, it may be confirmed whether the saving of the wave data is in course of being performed.

When the wave data is in course of being performed, it may be determined whether it is necessary to save next fault wave data. If it is determined that it is necessary to save the next fault wave data, the index may be included in the next fault wave data such that the next fault wave data is recorded in the buffer.

When the wave data is in course of being saved, and it is determined that it is necessary to save the next fault wave data, the saving of the wave data, which is currently being performed, may be continuously performed.

Hereinafter, a specific example of the recording and saving process will be described.

1) A total length of wave data is calculated, thereby calculating a total size of a memory in which the wave data is to be saved.

That is, if the length of the wave data to be saved is 128 cycles (about 2 seconds), a total required size of the memory is calculated by converting the length of the wave data at the sampling rate of a current device.

For example, if the wave data is sampled into 64 samples, and the length of the wave data is 128 cycles, the total required size of the memory is calculated by converting the length of the wave data into a minimum unit of byte, which can be saved in the memory per sample (If 4 bytes are required per channel, 40 bytes are required for 10 channels, and a size of 64×128×40, i.e., a total of 327680 bytes, is required).

2) After that, a division size, which is a minimum unit of the size in which the wave data is to be divided and saved, is measured. Then, the division size is divided by the total bytes calculated in 1).

For example, if 10 bytes per division size is the maximum, it is required to divide the wave data 32768 times.

3) Since the division size is calculated as described above, it is determined how many relay elements can be consecutively operated at the same time by checking the minimum operation time (50 ms) required in the consecutive operation of the relay elements and the number of relay elements capable of being maximally operated so as to provide real-time performance.

In this case, relay elements operated in a total period in which one wave data is saved may be excluded from the consideration of the corresponding time.

Figure 2:
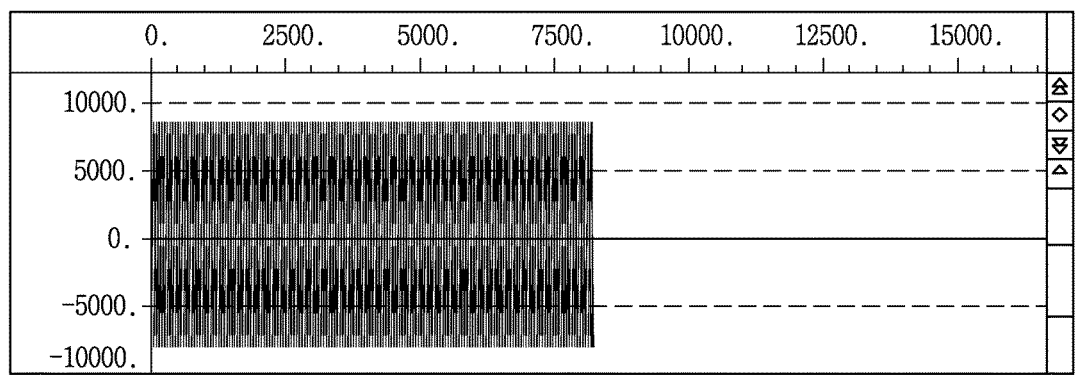
FIG. 2 is a graph 1 illustrating an example in which fault wave data is saved in a buffer according to a conventional art.
Figure 3:
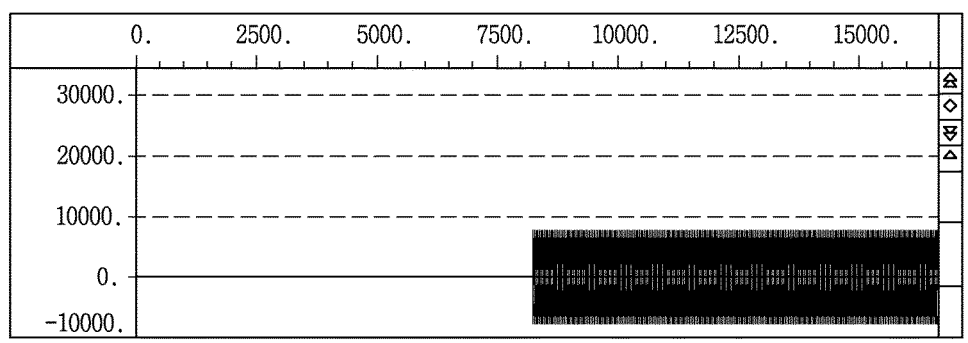
FIG. 3 is a graph 2 illustrating the example in which the fault wave data is saved in the buffer according to the conventional art.

4) If the saving time of the wave data having the division size is 104.07 μs in consideration of FIGS. 2 and 3, the saving of the wave data is performed within a corresponding time, based on about 3.41 s which is a maximum time calculated as 104.07×327680 such that next fault wave data is simultaneously saved.

That is, since the saving time is obtained, the size of the buffer is adjusted in a multiple manner so as to be used suitable for the saving time.

For example, since the size of the memory is 327680 bytes, the size of the buffer is adjusted by calculating the size of the buffer, required per channel, as 32768/(4*N) (here, N=number of multiple buffers, and 4=number of bytes per sample).

5) When faults consecutively occur, it is confirmed whether the saving of the wave data has been completed, by using the index and flag, which represent which number of times the wave data is saved, for example, a real raw data index and a currently saved flag, and the index of the buffer having current raw data saved therein is traced, thereby continuously recording and saving the wave data.

In the saving method according to the present disclosure, wave data is accurately calculated in advance, and minutely divided to a minimum unit, so that it is possible to minimize a delay in saving of the wave data.

Also, the delay in saving of the wave data is minimized, so that it is possible to record all accurate wave data even when consecutive faults occur.

Also, it is possible to efficiently use a space of the memory.

Also, it is possible to prevent the occurrence of an error due to allocation of the memory.

Also, the function of saving consecutive fault wave data is implemented and applied, so that it is possible to provide consistency in operation of the relay applied to the system and all accurate and consecutive data on the situation of a fault.

Also, it is possible to improve the reliability and satisfaction of a device, and maximize the efficiency use of the memory operated in the relay and the reliability of the operation of the memory.

Also, the saving method according to the present disclosure can be applied to all protection devices such as a relay, a switch, an electronic contactor, and a circuit breaker.

Also, the saving method according to the present disclosure can be applied to a central control device and a storage device, included in the protection device, a system control system, a system control method, a system monitoring device, a system monitoring method, and the like.

Particularly, the saving method according to the present disclosure can be usefully applied to a device and method for saving fault wave data in a digital relay.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for saving fault wave data, the method comprising:

detecting and sampling, via a Digital Signal Processor (DSP), a fault wave generated in a system;

calculating, via the DSP, a total length of sampled wave data;

calculating a division size and a saving time, where the wave data is to be saved, by dividing the wave data via the DSP, wherein the division size is a unit size in which the wave data is to be divided and saved, and the saving time is a time required to save the wave data according to the division size;

adjusting, via the DSP, the size of a buffer in a multi-buffer structure such that data on a next fault wave is to be recorded, based on the division size and the saving time according to the total length of sampled wave data divided by a product of the division size, bytes required per channel, and a number of multiple buffers; and saving, via the DSP, the wave data according to the division size and the saving time, wherein when the wave data is recorded into the buffer via the DSP, an index for detection information is included in the wave data.

2. The method of claim 1, wherein, in the calculating of the total length, a size of a memory in which the wave data is to be saved is calculated.

3. The method of claim 1, wherein the saving of the wave data includes recording next fault wave data in the buffer.

4. The method of claim 1, wherein the wave data is saved in real time by detecting the fault wave in real time.

* * * * *